United States Patent
Sato

(10) Patent No.: US 9,863,564 B2
(45) Date of Patent: Jan. 9, 2018

(54) CLAMP DEVICE

(71) Applicant: AISIN TAKAOKA CO., LTD., Toyota-shi (JP)

(72) Inventor: Katsuya Sato, Toyota (JP)

(73) Assignee: AISIN TAKAOKA CO., LTD., Toyota-Shi (JP)

( * ) Notice: Subject to any disclaimer, the term of this patent is extended or adjusted under 35 U.S.C. 154(b) by 0 days.

(21) Appl. No.: 14/411,836

(22) PCT Filed: Jul. 11, 2013

(86) PCT No.: PCT/IB2013/055687
§ 371 (c)(1),
(2) Date: Dec. 29, 2014

(87) PCT Pub. No.: WO2014/016721
PCT Pub. Date: Jan. 30, 2014

(65) Prior Publication Data
US 2015/0204471 A1    Jul. 23, 2015

(30) Foreign Application Priority Data

Jul. 25, 2012 (JP) .................................. 2012-164777

(51) Int. Cl.
*F16L 23/00* (2006.01)
*F16L 33/04* (2006.01)
(Continued)

(52) U.S. Cl.
CPC ............... *F16L 33/04* (2013.01); *F16L 23/08* (2013.01); *F01N 13/1811* (2013.01); *Y10T 24/1451* (2015.01)

(58) Field of Classification Search
USPC .......... 285/410, 420, 367, 337; 24/279, 282, 24/284
See application file for complete search history.

(56) References Cited

U.S. PATENT DOCUMENTS 1,284,325 A *  11/1918 Hart ................................ 24/279
4,834,431 A    5/1989 Calmettes et al.
(Continued)

FOREIGN PATENT DOCUMENTS

CN    1890500 A    1/2007
CN    101251212 A    8/2008
(Continued)

OTHER PUBLICATIONS

International Search Report (PCT/ISA/210) mailed on Dec. 17, 2013, by the Japanese Patent Office as the International Searching Authority for International Application No. PCT/IB2013/055687.
(Continued)

*Primary Examiner* — Aaron Dunwoody
(74) *Attorney, Agent, or Firm* — Buchanan Ingersoll & Rooney PC

(57) ABSTRACT

In a clamp device, a main clamp body includes an elongated tightening groove delimited by groove-forming wall sections. First and second lobe parts are disposed in the vicinity of end portions of two such tightening grooves. The main clamp body presents a ring shape when bolt and nut are mounted in position on the lobe parts disposed facing each other. Each of the lobe parts includes sidewall sections respectively contiguous to the groove delimiting wall sections that delimit the tightening groove. Each lobe part also includes a curved outer end wall section interconnecting the sidewall sections at an outer end of each lobe part and a seat surface wall section contiguous to the sidewall sections and to the outer end wall section. The seat surface wall section provides a bolt/nut seat surface. An arcuately shaped fulcrum part is formed on the curved outer end wall section of each lobe part.

6 Claims, 8 Drawing Sheets

(51) Int. Cl.
 F16L 23/08 (2006.01)
 F01N 13/18 (2010.01)

(56) References Cited

U.S. PATENT DOCUMENTS

| | | | |
|---|---|---|---|
| 5,570,499 A * | 11/1996 | Katayama et al. | 24/285 |
| 5,782,499 A * | 7/1998 | Gfrerer et al. | 285/23 |
| 6,464,268 B1 * | 10/2002 | Hough et al. | 285/367 |
| 7,533,910 B2 * | 5/2009 | Ma et al. | 285/420 |
| 8,632,105 B2 * | 1/2014 | Krueger | 285/420 |
| 2008/0197627 A1 | 8/2008 | Baudoin et al. | |
| 2013/0291346 A1 * | 11/2013 | Krueger et al. | 24/284 |

FOREIGN PATENT DOCUMENTS

| | | |
|---|---|---|
| EP | 1 962 008 A1 | 8/2008 |
| JP | 59-67538 U | 5/1984 |
| JP | 7-233888 A | 9/1995 |
| JP | 2008-202791 A | 9/2008 |

OTHER PUBLICATIONS

Written Opinion (PCT/ISA/237) mailed on Dec. 17, 2013, by the Japanese Patent Office as the International Searching Authority for International Application No. PCT/IB2013/055687.

International Preliminary Report on Patentability (PCT/IPEA/409) mailed on Jul. 25, 2014 for International Application No. PCT/IB2013/055687.

Chinese Second Office Action dated Jul. 19, 2016, by the Chinese Patent Office, in corresponding Chinese Patent Application No. 201380035507.4 and English translation of Chinese Office Action (16 pages).

Chinese Office Action dated Nov. 27, 2015, by the Chinese Patent Office, in corresponding Chinese Patent Application No. 201380035507.4 and English translation of Chinese Office Action (13 pages).

* cited by examiner (A)

(B)

(A)

(B)

CLAMP DEVICE

TECHNICAL FIELD

Cross-Reference to Related Applications

The present application claims priority based on JP Patent Application 2012-164777 filed in Japan on Jul. 25, 2012, whose entire disclosure is incorporated by reference into the present Application.

This invention relates to a clamp device including a substantially ring-shaped or a C-shaped main body, a bolt and a nut, with the ring-shaped main body including a pair of elongated grooved parts each having a U- or V-shaped transverse cross-section. By screw-tightening the bolt and nut, a fastening force can be exerted to objects placed for fastening within the tightening grooved parts.

BACKGROUND

The above mentioned clamp device is used for interconnecting piping components in an exhaust system for an automotive engine, as an example (inter alia piping components for a turbo-charger). Several pertinent techniques have so far been applied for patent or utility model. Examples of these techniques include 'Clamp for supercharger' disclosed in Patent Literature 1, 'Fixed bolt type coupling' disclosed in Patent Literature 2 and 'Ring-shaped clamp' disclosed in Patent Literature 3. In particular, the basic structure of the ring-shaped clamp, disclosed in Patent Literature 3, is rather similar to the structure of the clamp device which is indicated herein in FIG. 1 to FIG. 3 and which is referred to herein as Comparative Example (Related Art Example). In the following, the clamp device (Comparative Example) shown herein in FIG. 1 to FIG. 3 will be illustrated in place of discussing the related art technique.

Referring to FIG. 1 to FIG. 3, the clamp device, the present invention is to be compared to, includes a main clamp body 10, a connecting ring 21, a bolt 22 and a nut 23. The main clamp body 10 is made up by upper and lower pair clamp members 11, 12. The upper clamp member 11, that is, a first clamp member, and the lower clamp member 12, that is, a second clamp member, are semi-arcuately shaped. Each of the first and second clamp members has its inner rim side formed with an elongated tightening groove 13 having a U- or V-shaped transverse cross-section. Each of the first and second clamp members 11, 12 includes a curled part 14 at its one end, while including a lobe part 15 at its opposite end. The curled part 14 of the first clamp member 11 and the curled part 14 of the second clamp member 12 are interconnected by the connecting ring 21, so that the two clamp members 11, 12 may be rotated relative to one another, that is, moved in a opening or closing direction, about a site of the interconnection as the center of rotation. With the lobe part 15 of the first clamp member 11 (first lobe part) located in a facing relationship and in proximity to the lobe part 15 of the second clamp member 12 (second lobe part), the clamp body 10, made up by the two clamp members, presents a C-shape when viewed from the front side. In this Comparative Example, the bolt 22 has its head welded to the first lobe part, while having its shank passed through a through-hole, not shown, bored in the second lobe part. The nut 23 is screwed onto a portion of the shank of the bolt 22 protruded from the underside of the lobe part, whereby the main clamp body 10 as a whole is toroidally-shaped when viewed from the front side.

As may be viewed from FIG. 1 to FIG. 3, each of the first and second lobe parts 15 includes a pair of sidewall sections 31, an outer end wall section 32 and a seat surface wall section 33. The outer end wall section is straight-shaped (flat) and interconnects the pair of sidewall sections 31 at an extreme outer (remote) end of the lobe part. The seat surface wall section, formed contiguous with both the pair of sidewall sections 31 and the outer end wall section 32, provides a seat surface for the bolt 22 or the nut 23. In addition, a fulcrum part 34, rectangular-shaped when viewed in a plan view, is formed extending from the lower or upper side of the straight-shaped outer end wall section 32 of each of the lobe parts 15. This fulcrum part 34 is formed by 'bend working' by a press at the time of press forming of each of the lobe parts 15 of the clamp members.

Referring to FIG. 4 for example, in using the clamp device, a flange 41f of a first piping component 41 and a flange 42f of a second piping component 42 are contacted with each other. In this state, the main clamp body 10 is fitted over outer surface sides of the flange 41f of the first piping component 41 and the flange 42f of the second piping component 42. The nut 23 is then threadedly engaged with the shank of the bolt 22 of the clamp device to be tightened. By so doing, the toroidally-shaped main clamp body 10 is gradually reduced in diameter, with the connecting flanges (41f, 42f) progressively intruding into the insides of the tightening grooves 13 of the main clamp body 10. Concomitantly, there is developed, in the flanges 41, 42, a screw-tightening torque (flange fastening force F) in a direction of strengthening the connection between the two flanges 41, 42 (in the horizontal direction in FIG. 4), thereby tightly clamping the flanges together by the clamp device.

PATENT LITERATURE (PTL)

[PTL 1]
JP Utility Model Kokai JPU59-67538A (FIG. 3, FIG. 4)
[PTL 2]
JP Patent Kokai JP7-233888A (FIG. 7, FIG. 8)
[PTL 3]
JP Patent Kokai JP2008-202791A

SUMMARY

The disclosures of the above mentioned Patent Literatures and Non-Patent Literatures are incorporated herein by reference.
The following analysis is given by the present invention.
In the clamp device of the Comparative Example (Related Art Techniques), the flange fastening force F may not be said to be of a sufficient value compared to the magnitude of the nut screw-tightening torque. Hence, leakage of the exhaust gas may not be excluded completely. An operator at the working site may thus be forced to use a nut screw-tightening torque which has to be large enough to develop a flange fastening force of a sufficient magnitude. However, an excess nut screw-tightening torque tends to bring about the following inconveniences (flaws or defects):
(1) Each lobe part of the main clamp body may be unable to sustain the axial force exerted by the nut and bolt, so that the seat surface wall section 33 of each lobe part for the bolt or the nut may be subject to plastic deformation.
(2) If the seat surface wall section 33 of the lobe part is subject to plastic deformation, the flange fastening force F developed may not be as high as expected even though a large axial force is exerted at the bolt and nut. Thus, in an effort to develop a greater flange fastening force F, one may fall into a vicious cycle of (1) to (2), then back to (1), then again to (2) and so forth. Ultimately, the flange fastening force may not be stabilized, with the flange fastening operation being only poor in reproducibility or reliability.

(3) Moreover, if, in an effort to develop the flange fastening force F which is able to durably sustain a mechanical force unavoidably inflicted from outside, such as vibrations, the force exerted axially at the bolt and nut is increased, the bolt may be warped under the excessive axial force exerted. In such case, the functions proper to the clamp device would be lost.

Thus, there is a need in the art to overcome the inconveniences referred to above. It is a principal object of the present invention to provide a clamp device that is able to develop a flange fastening force relatively larger than heretofore by a nut screw-tightening torque relatively smaller than heretofore.

<Analysis of Causes of Problems in Comparative Example (Related Technique Example)>

The present inventors scrutinized possible causes of plastic deformation of the seat surface wall section 33 of the lobe part brought about under the axial force exerted by the bolt/nut. It has been found that the cause for the tendency towards the plastic deformation referred to above does not reside in the setting of thicknesses of the seat surface wall section 33, outer end wall section 32 or the sidewall sections 31 of the lobe parts, but rather in a low toughness at the fulcrum parts 34 formed projecting from the outer end wall section 32. That is, in this sort of the clamp device, a 'fulcrum point' is formed by the fulcrum parts 34 of the two lobe parts bearing against each other by screw-tightening the nut against the bolt shank. By the fulcrum parts of the two lobe parts thus bearing against each other and probing to be the fulcrum point for the annular clamp device, the nut screw-tightening operation translates itself into the action of reducing the diameter of the main clamp body, thus developing the flange fastening force F. In the clamp device of the Comparative Example, the fulcrum parts 34 of the lobe parts are low in the toughness. Thus, as the nut screw-tightening torque increases, the fulcrum parts are the first to be subject to plastic deformation. The influence of plastic deformation produced in each fulcrum part 34 is propagated, relatively at an early stage, to the outer end wall sections 32 of the lobe parts and to the seat surface wall section 33 thus inducing the plastic deformation of the seat surface wall section 33 and so forth. In other words, the plastic deformation at the seat surface wall section 33 is instigated by that at the fulcrum parts 34.

On the other hand, the outer end wall sections 32, interconnecting the pair of sidewall sections at the lobe parts, are straight-shaped and are at right angles to the sidewall sections. Hence, the outer end wall sections 32 per se are not contributing to increase in the toughness of the fulcrum parts 34. In more concrete terms, the relationship between the outer end wall sections 32 and the fulcrum parts 34 and that between the outer end wall sections 32 and the sidewall sections 31 in the Comparative Example are not such as will directly induce any positive synergistic effects resulting from interconnection of the two portions. That is, these portions may not be said to be intimately structurally correlated with one another in such a manner as to mutually improve their mechanical toughness. The implicit meaning of the above will become clearer as the present description proceeds.

Based on the above analysis, the present invention, as now described, has been brought to completion.

Present Invention

In a clamp device according to the present invention, a main clamp body includes a pair of tightening grooves each of which is delimited (defined) by a pair of groove-delimiting wall sections, with the elongated tightening grooves each having a U- or V-shaped transverse cross-section. The main clamp body also includes first and second lobe parts disposed in the vicinity of end parts of the tightening grooves. The main clamp body presents a ring shape when a bolt and a nut are mounted in position on the lobe parts disposed facing each other. When the bolt and the nut are screw-tightened relative to each other, there is produced a force of fastening together at least two objects placed within the tightening grooves.

Each of the first and second lobe parts comprises: a pair of sidewall sections respectively contiguous to the pair groove-delimiting wall sections that delimit the tightening groove. Each of the first and second lobe parts also include a curved outer end wall section interconnecting the pair of sidewall sections at an outer end of each lobe part, and a seat surface wall section contiguous to the pair of sidewall sections and to the outer end wall section. The seat surface wall section provides a seat surface for the bolt or the nut. An arcuately shaped fulcrum part is formed on the curved outer end wall section of each lobe part so as to extend along a curving direction of the outer end wall section, and end portions reaching the side wall in the fulcrum part are projecting from the side wall.

According to the present invention, the outer end wall section of the main clamp body, interconnecting the paired sidewall sections that make up the lobe parts, is curved in shape. An arcuately shaped fulcrum part is formed on the curved outer end wall section so as to extend along the curving direction thereof. As a result of this configuration, the arcuately shaped fulcrum part of the present invention is drastically improved in toughness as compared to the conventional rectangular-shaped fulcrum part which is extended from the straight-shaped outer end wall section in the form of a projection. Since the outer end wall section is curved in shape, the load sustained by the arcuately shaped fulcrum parts can be distributed in a straight manner between the two sidewall sections without difficulty. Hence, the lobe parts as a whole can be improved in toughness. As a result, even though an excess screw-tightening torque is exerted during nut screw-tightening, the arcuately shaped fulcrum part is not readily subject to plastic deformation, and hence the lobe parts, inter alia the seating wall surface sections, are not readily subject to plastic deformation. Consequently, a large flange fastening force can be developed with a smaller nut screw-tightening torque.

In the clamp device according to the present invention, it is preferred that both end portions of the arcuately shaped fulcrum parts extend to and are integral with the pair of sidewall sections. With such configuration, not only the arcuately shaped fulcrum points but also the entire lobe parts may be improved in toughness, thus further enhancing the advantageous effects of the present invention.

(Supplemental Notes)

Further preferred modes or additional constituent elements of the present invention will now be enumerated. The main clamp body includes semi-arcuately shaped first and second clamp members. The first and second clamp members are provided at one ends thereof with connecting portions and at the opposite ends with lobe parts. The connecting portion of the first clamp member is connected by a connecting means to the connecting portions of the second clamp member. In this manner, the main clamp body is able to perform an opening/closure movement about the connection site by the above mentioned connection means as a center.

Advantageous effects of Invention are mentioned below without limitation.

With the clamp device of the present invention, a flange fastening force relatively greater than heretofore can be produced by a nut screw-tightening torque smaller than heretofore.

PREFERRED MODES

An Example of the present invention will now be described with reference to the drawings.

Figure 4:
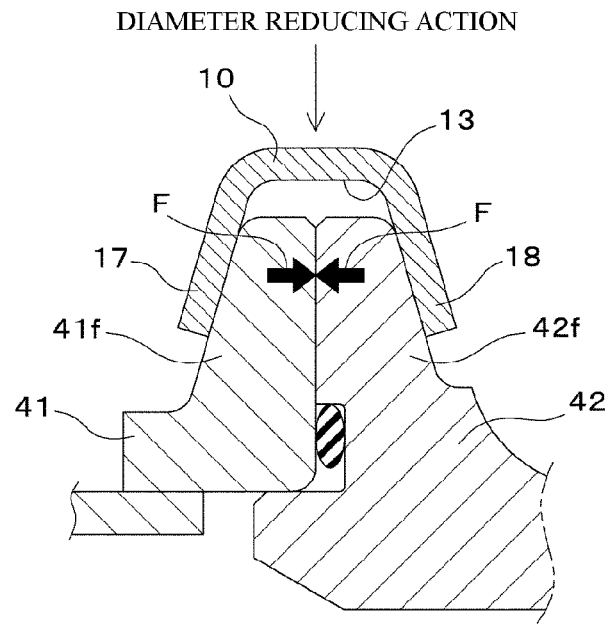
FIG. 4 is a schematic cross-sectional view illustrating the manner in which two flanges are fastened together by the clamp device.

Referring to FIG. 5 to FIG. 8, a clamp device of the present Example includes a main clamp body 10, a connecting ring 21, as a connection means, a bolt 22 and a nut 23. The main clamp body is made up by first and second clamp members 11, 12. The first clamp member 11 is an upper clamp member and the second clamp member 12 is a lower clamp member. Each of the first and second clamp members 11, 12 is semi-arcuately shaped, and includes, in its inner rim side, an elongated tightening groove 13 having a U- or V-shaped transverse cross-section. It is noted that the elongated tightening groove 13 of the main clamp body 10 is defined, that is, delimited, by a pair of groove-forming wall sections 17, 18 owned by the clamp members, as shown in FIG. 4.

Each of the first and second clamp members (or pieces) 11, 12 includes, at its one end, a curled part 14, as a connecting section, while including, at its opposite end, a lobe part 15. The curled part 14 of the first clamp member 11 and the curled part 14 of the second clamp member 12 are interconnected by the above mentioned connecting ring 21, so that the two clamp members may be rotated relative to one another, that is, moved in an opening or closing direction of the clamp members, about a site of the interconnection by the connecting ring 21 as a center of rotation.

Figure 5:
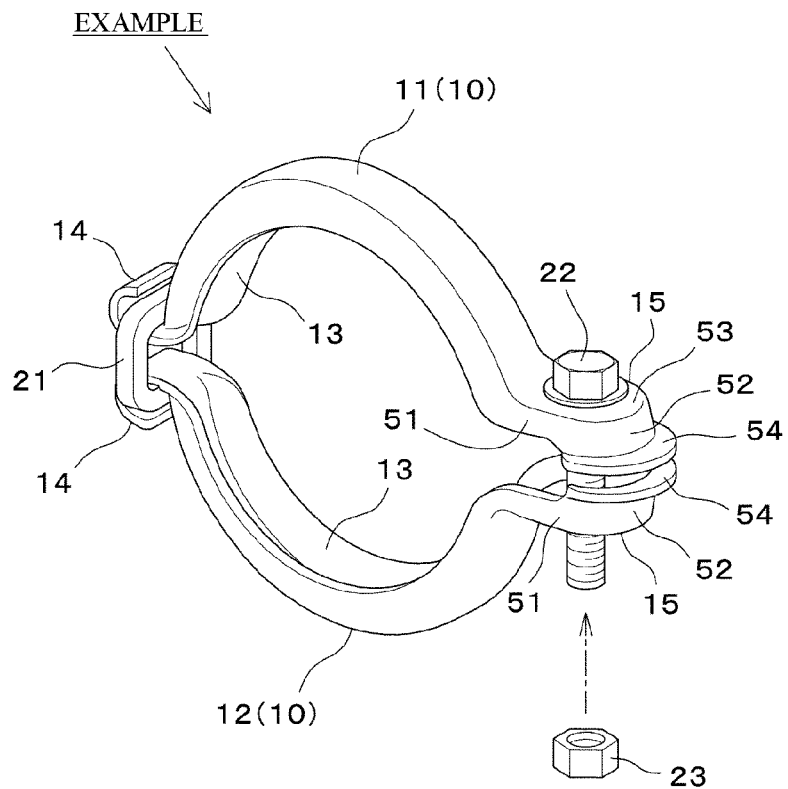
FIG. 5 is a perspective view showing a clamp device of an Example of the present invention.
Figure 6:
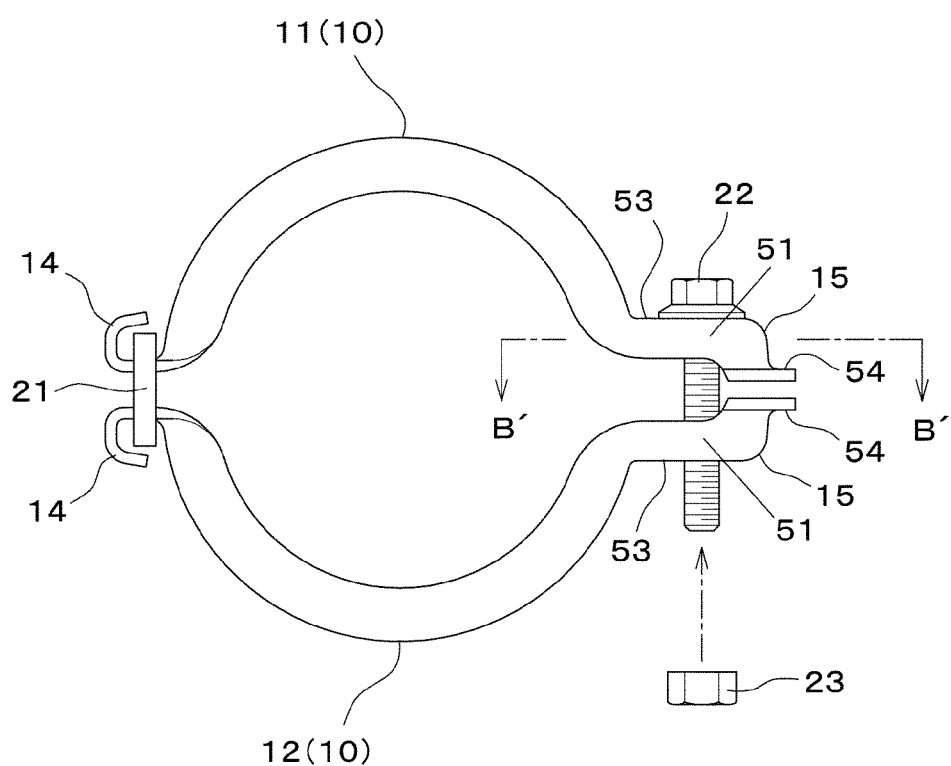
FIG. 6 is a front view showing the clamp device of the Example of the present invention (before fastening).

With the lobe part 15 of the first clamp member 11 (first lobe part) located in a facing relationship and in proximity to the lobe part 15 of the second clamp member 12 (second lobe part), the clamp body 10, made up by the two clamp members, interconnected by the connecting ring 21, presents a C-shape when viewed from the front side (see FIG. 6). In the present Example, the bolt 22 has its head secured to the first lobe part by welding, while having its shank passed through a hole, not shown, bored through the second lobe part (see FIG. 5, FIG. 6). The nut 23 is screwed onto a (threaded) portion of the shank of the bolt 22 protruded from the underside of the second lobe part, whereby the main clamp body 10 on the whole presents a substantially toroidal (or ring) shape when viewed from the front side (see FIG. 8).

Figure 7:
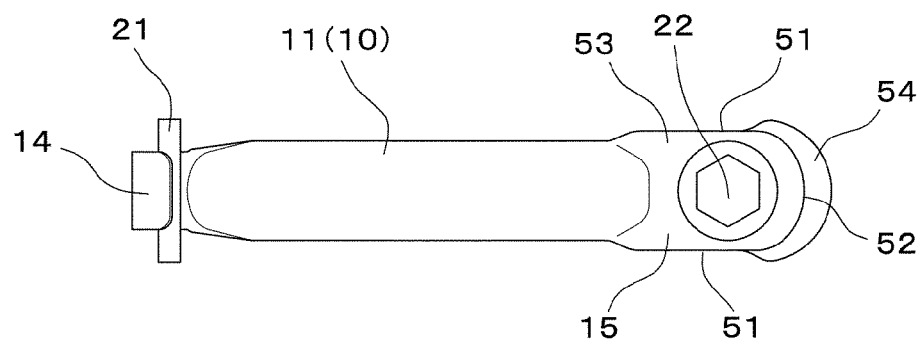
FIG. 7(A) is a plan view (top plan view) of the clamp device of the Example of the present invention.
FIG. 7(B) is an enlarged cross-sectional view taken along line B'-B' of FIG. 6.
Figure 7:
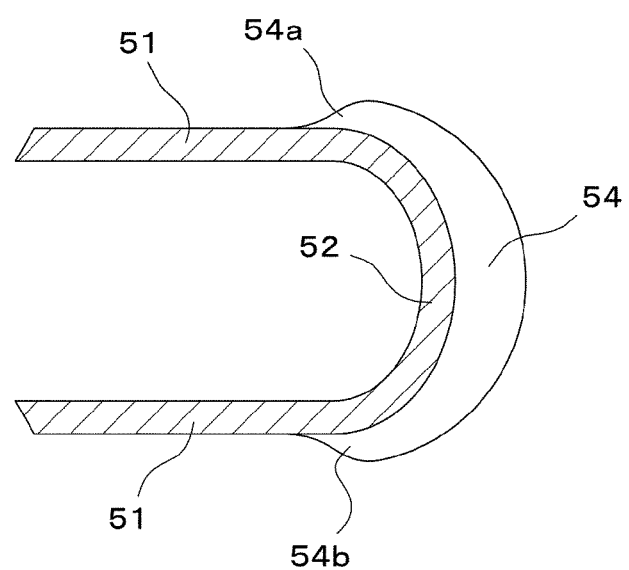
Figure 8:
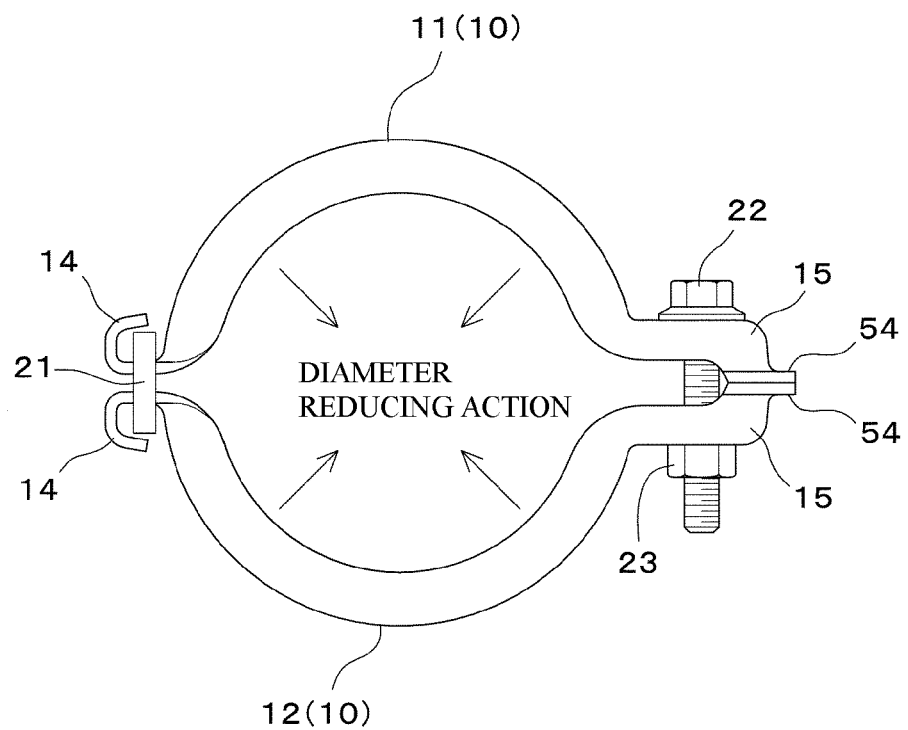
FIG. 8 is a front view showing the clamp device of the Example of the present invention (after fastening).

Referring to FIG. 5 to FIG. 7, the first and second lobe parts 15 are protruded radially outwards, respectively, from the end parts of the substantially toroidally-shaped main clamp body 10. Each lobe part 15 includes a pair of sidewall sections 51, a curved outer end wall section 52, a seat surface wall section 53 and an arcuately shaped fulcrum part 54.

The pair of sidewall sections 51 are contiguous to a pair groove-forming wall sections 17, 18 that delimit the elongated tightening groove 13. The curved outer end wall section 52 interconnects the pair of sidewall sections 51 at the outer end of each lobe part 15. It is noted that the pair of sidewall sections 51 and the curved outer end wall section 52 form upstanding wall sections (a three-sided upstanding wall section) surrounding the three sides of each lobe part 15. The seat surface wall section 53 is contiguous to the pair of sidewall sections 51 and to the curved outer end wall section 52, and operates as seat surface (seating surface) for the bolt 22 or the nut 23. Insofar as the lobe part 15 of the first clamp member 11 (first lobe part) is concerned, the ceiling wall section of the lobe part operates as the seat surface wall section 53 for the bolt 22, which bolt has its head part welded to the seat surface wall section 53. On the other hand, as for the lobe part 15 of the second clamp member 12 (second lobe part), the bottom wall section of the lobe part operates as the seat wall section 53 for the nut 23.

On a lower edge of the outer end wall section 52 of the lobe part 15 of the first clamp member 11 (first lobe part) is formed the fulcrum part 54 for extending along the (direction of) curvature of the curved outer end wall section 52. The fulcrum part is of the shape of an arc and, in the present Example, it is of the shape of part of an ellipsis. On an upper edge of the outer end wall section 52 of the lobe part 15 of the second clamp member 12 (second lobe part) is similarly formed the fulcrum part 54 for extending along the (direction of) curvature of the curved outer end wall section 52. The fulcrum part is again of the shape of an arc and, in the present Example, it is of the shape of part of an ellipsis. Not only is each of the fulcrum parts 54 of the shape of part of an ellipsis when seen in a plan view, but each fulcrum part has its ends 54a, 54b extended to arrive at the pair of sidewall sections 51 where the fulcrum part ends are unified to the sidewall sections 51. In short, the three upstanding wall sections (51, 52, 51) of each lobe part 15 are contiguous to the fulcrum part 54 which is shaped as part of an ellipsis and which is extended horizontally like a guard of sword.

The method of using the clamp device of the present Example is basically the same as that of using the clamp device of the Comparative Example already explained with reference to FIG. 4. In the present Example, the clamp device 10 in its entirety is contracted in diameter as a result of screw-tightening the nut 23 against (onto) the bolt 22 (see FIG. 8), so that a flange fastening force F is developed between the two piping components 41f, 42f as the objects to be fastened together (see FIG. 4).

Figure 1:
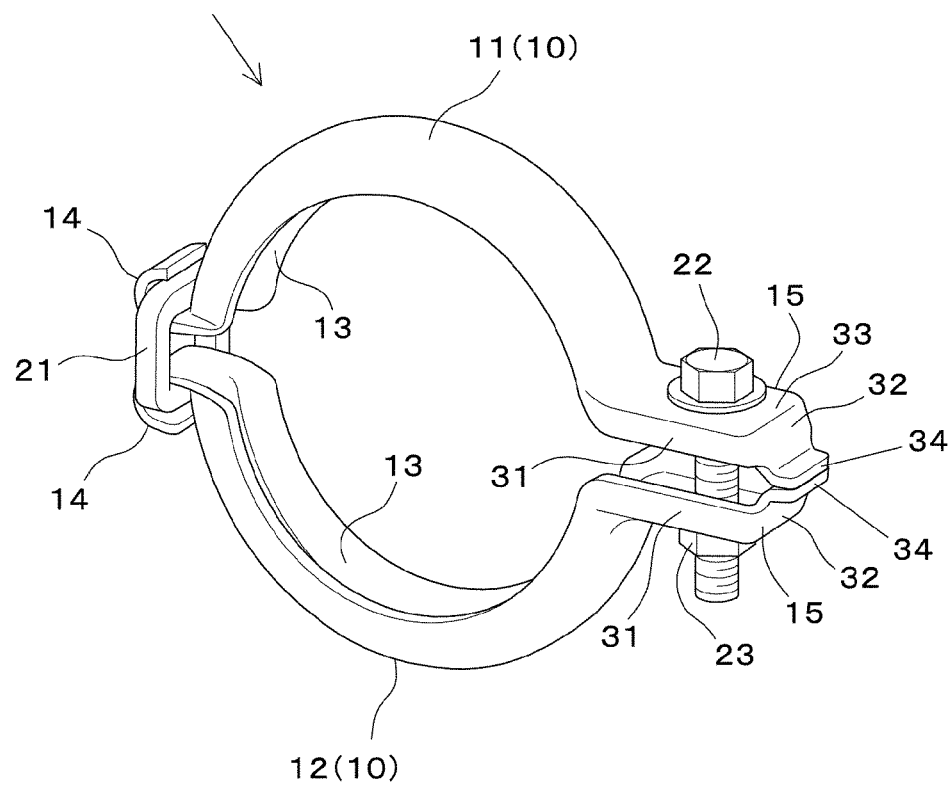
FIG. 1 is a perspective view showing a clamp device of a Comparative Example (related art technique).
Figure 2:
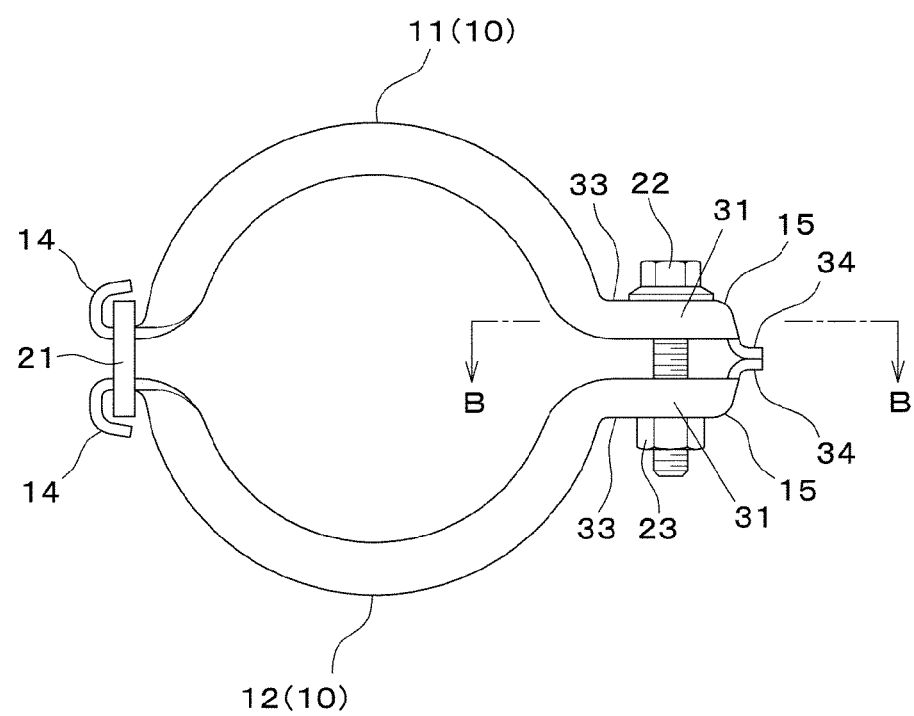
FIG. 2 is a front view showing the clamp device of the Comparative Example (related art technique).
Figure 3:
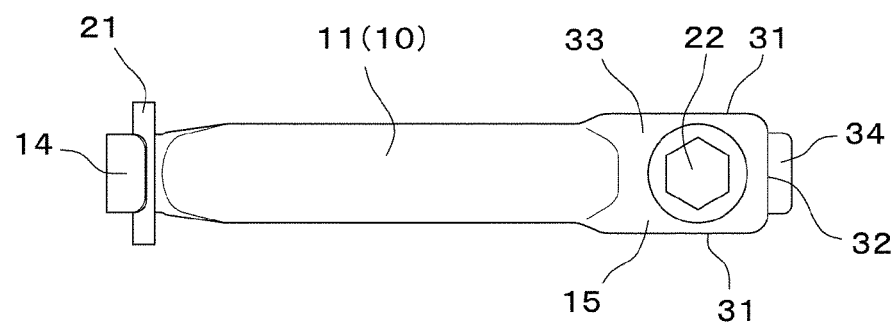
FIG. 3(A) is a plan view (top plan view) showing the clamp device of the Comparative Example.
FIG. 3(B) an enlarged cross-sectional view taken along line B-B of FIG. 2.
Figure 3:
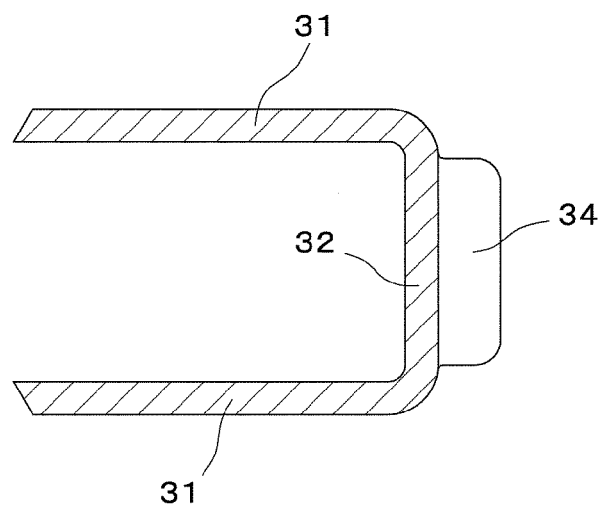
Figure 9:
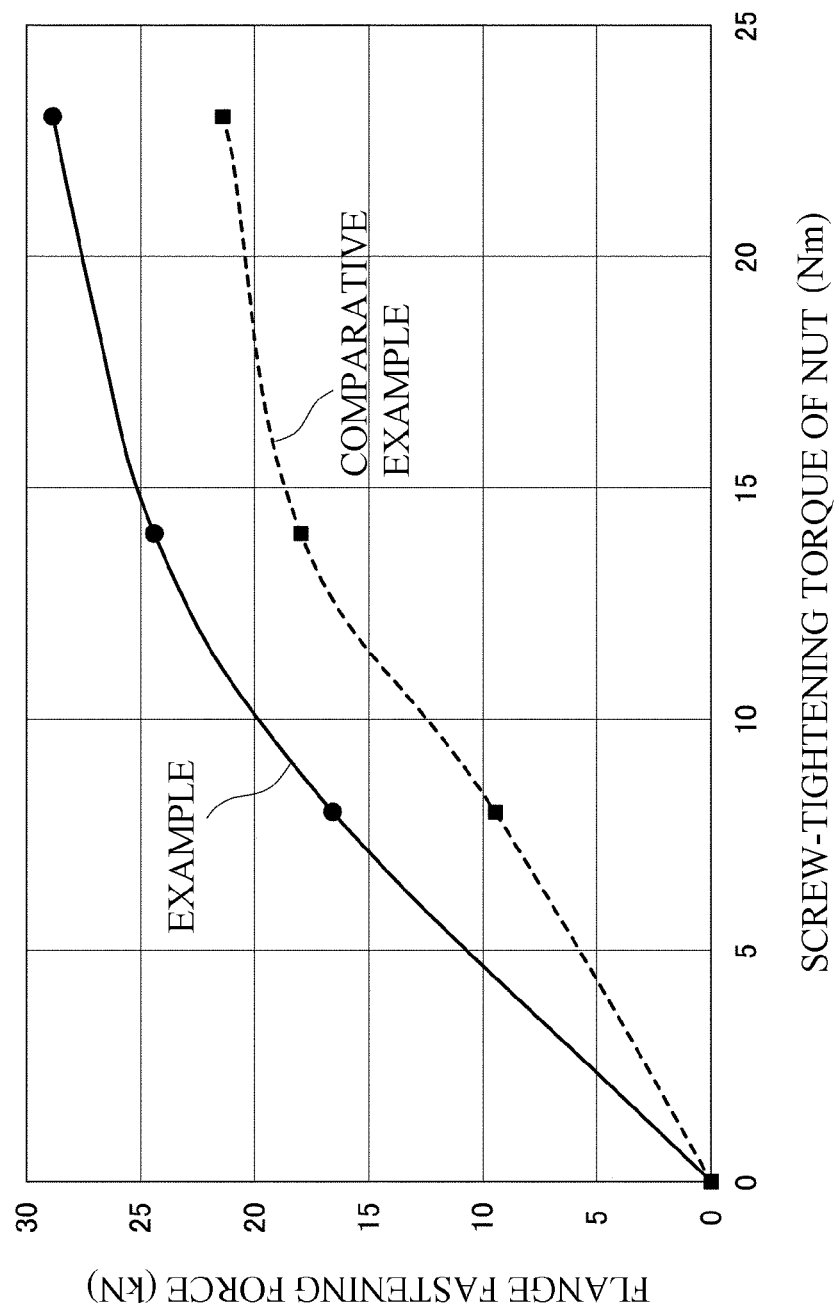
FIG. 9 is a graph showing the relationship between the nut screw-tightening torque and the flange fastening force in the Example and in the Comparative Example.

The graph of FIG. 9 shows the results of measurement of the relationship between the nut screw-tightening torque (Nm) and the flange fastening force (kN) for the cases of the Example of the present invention (FIG. 5 to FIG. 8) and the above described Comparative Example (FIG. 1 to FIG. 3). It should be noted that the Example and the Comparative Example differ from each other just as to the structure of the lobe part 15, while there is no difference as to the size or the shape of the main clamp body 10. It is viewed from FIG. 9 that the flange fastening force F of the Example is greater than that of the Comparative Example over the entire measured range of the nut screw-tightening torque.

Advantageous Effect of the Example

Such a situation in which the seat surface wall sections 53 of the lobe parts 15 are unable to sustain the axial force exerted at the bolt and nut and hence are subject to plastic deformation may be suppressed to the utmost extent possible. As a result, a sufficient flange nut fastening force F, which is close to its expected value, may be developed even though the axial force exerted at the bolt and nut is rather small. Additionally, the flange fastening operation may be improved in reproducibility and in reliability as compared to that with the comparative example, as a related art.

The flange fastening force that may be developed may be made relatively greater than heretofore with a nut screw-tightening torque relatively smaller than heretofore. It is thus possible to avoid such a situation frequently met in the prior art example, i.e., a situation in which 'a bolt becomes warped under an excessively large axial force to lead to loss of the inherent function of the clamp device'.

With the fulcrum part 54 at the lobe part 15 in the arc form of a part of an ellipsis, the press forming may be improved in accuracy. Specifically, the conventional fulcrum part 34 in the form of a rectangular-shaped projection is subject to springback following the press forming, thus leading to only poor machining accuracy such as in shape and size etc. With the fulcrum part 54 in the arc form of a part of an ellipsis, as in the present Example, springback is less liable to be produced, thus leading to improved machining accuracy (in the shape/size etc.). As a result, in the clamp device of the present Example, the pre-shipment quality test pass percentage has been improved significantly.

Variant Example

In the above described Example, the bolt 22 is welded to the lobe part 15 of the first clamp member 11, with the nut 23 being a separate body from the clamp members 11, 12. Alternatively, the nut 23 may be welded to the lobe part 15 of the second clamp member 12, with the bolt 22 then being a separate body from the clamp members 11, 12. Still alternatively, both the bolt 22 and the nut 23 may be separate entities from the clamp members 11, 12.

DEFINITION OF TERM

In the Description and the Claims, an expression 'arcuate' in 'an arcuately shaped fulcrum part' denotes that the shape of the fulcrum part (54) as viewed in a plan view is the shape conforming to a curved shape of the curved outer end wall section (52). That is, the expression 'arcuate' is herein meant to imply all the curved shape configuration that may be expressed by such terms as an arc, a part of an ellipsis or an arch shape.

It should be noted that symbols for having reference to the drawings, as used in the present Application, are exclusively for assisting in understanding and are not intended to restrict the invention to the mode(s) illustrated.

The disclosures of known technical literatures, including the above indicated Patent Literatures, are to be incorporated herein by reference. The particular exemplary embodiments or examples may be modified or adjusted within the gamut of the entire disclosure of the present invention, inclusive of claims, based on the fundamental technical concept of the invention. Moreover, a variety of combinations or selection of elements herein disclosed, inclusive of various elements of the claims, exemplary embodiments, Examples or figures, may be made within the concept of the claims. It is to be understood that the present invention is to include a variety of changes or corrections that may occur to those skilled in the art in accordance with the entire disclosures inclusive of the claims and the technical concept of the invention. Inter alia, if the ranges of numerical values are indicated herein, they should be construed as indicating any arbitrary numerical values or sub-ranges comprised within such ranges even if such effect is not stated explicitly.

REFERENCE SIGNS LIST 10 main clamp body
11, 12 first and second clamp members
13 elongated tightening groove
14 curled part (connecting section)
15 lobe part
17, 18 (a pair of) groove-forming wall sections
21 connecting ring (connection means)
22 bolt
23 nut
41f, 42f flanges of piping components (objects to be fastened together)
51 (a pair of) sidewall sections
52 curved outer end wall section
53 seat surface wall section
54 arcuately shaped fulcrum part
54a, 54b both ends of the arcuately shaped fulcrum part
F flange fastening force

The invention claimed is:

1. A clamp device in which a main clamp body comprises a pair of clamp members, each clamp member having a tightening groove delimited by a pair of groove-delimiting wall sections; the tightening grooves each having a U- or V-shaped transverse cross-section; and first and second lobe parts disposed integrally with the pair of clamp members in the vicinity of end portions of the tightening grooves; the main clamp body presenting a ring shape when a bolt and a nut are mounted in position on the lobe parts disposed facing each other; the bolt and the nut when screw-tightened relative to each other developing a force of fastening together at least two objects placed within the tightening grooves; wherein, each of the first and second lobe parts comprises:
  a pair of sidewall sections respectively contiguous to the pair of groove-delimiting wall sections that delimit the tightening groove;
  a curved outer end wall section interconnecting the pair of sidewall sections at an outer end of each lobe part; and
  a seat surface wall section contiguous to the pair of sidewall sections and to the outer end wall section; the seat surface wall section providing a seat surface for the bolt or the nut;
  an arcuately shaped fulcrum part being formed on the curved outer end wall section of each lobe part so as to extend horizontally along a curving direction of the outer end wall section, end portions reaching the side wall in the fulcrum part projecting from the side wall, each fulcrum part in contact with the other when fastened and extending outwardly to exceed a width of each lobe part, and ends of the clamp members opposite the lobe parts being hingedly connected by a connecting ring.

2. The clamp device according to claim 1, wherein, both end portions of each arcuately shaped fulcrum part extend to be integral to the paired sidewall sections.

3. A clamp device in which a main clamp body comprises a pair of clamp members, each clamp member having a tightening groove delimited by a pair of groove-delimiting wall sections; the tightening grooves each having a U- or V-shaped transverse cross-section; and first and second lobe parts disposed integrally with the pair of clamp members in the vicinity of end portions of the tightening grooves; the main clamp body presenting a ring shape when a bolt and a nut are mounted in position on the lobe parts disposed facing each other; the bolt and the nut when screw-tightened relative to each other developing a force of fastening together at least two objects placed within the tightening grooves; wherein, each of the first and second lobe parts comprises:

a pair of sidewall sections respectively contiguous to the pair of groove-delimiting wall sections that delimit the tightening groove;

a curved outer end wall section interconnecting the pair of sidewall sections at an outer end of each lobe part; and a seat surface wall section contiguous to the pair of sidewall sections and to the outer end wall section; the seat surface wall section providing a seat surface for the bolt or the nut;

an arcuately shaped fulcrum part formed on the curved outer end wall section of each lobe part so as to extend along a plane of a radius of curvature defined by a curving direction of the outer end wall section, a pair of end portions of the fulcrum part projecting outwardly from the pair of sidewall sections whereby a width defined by the fulcrum part exceeds a width defined by the sidewall sections, the clamp device being configured so that the fulcrum part of the first lobe part contacts the fulcrum part of the second lobe part when the bolt and the nut are fastened, and ends of the clamp members opposite the lobe parts being hingedly connected by a connecting ring.

4. The clamp device according to claim 3, wherein the pair of end portions of each arcuately shaped fulcrum part are monolithically formed as one piece with the pair of sidewall sections.

5. The clamp device according to claim 3, wherein the connecting ring has an annular rectangular shape.

6. The clamp device according to claim 4, wherein the connecting ring has an annular rectangular shape.

\* \* \* \* \*